Feb. 2, 1932.  R. C. CROSLEN  1,843,123
HIGH PRESSURE HOSE CONNECTION
Filed Feb. 3, 1930
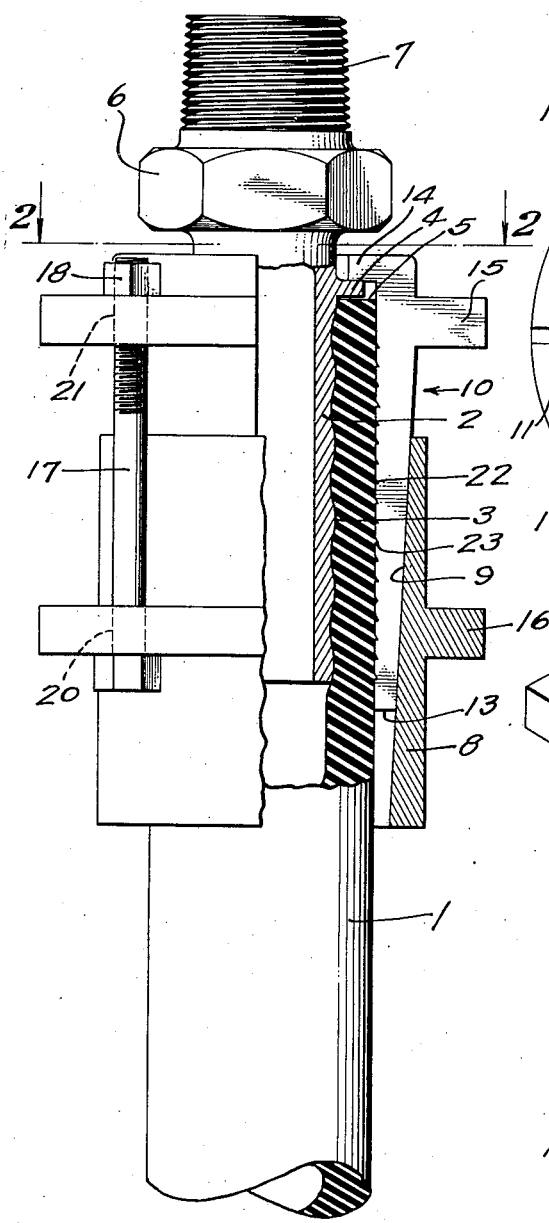
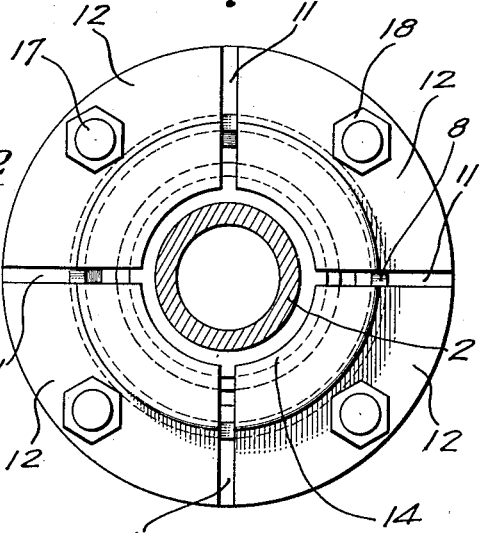
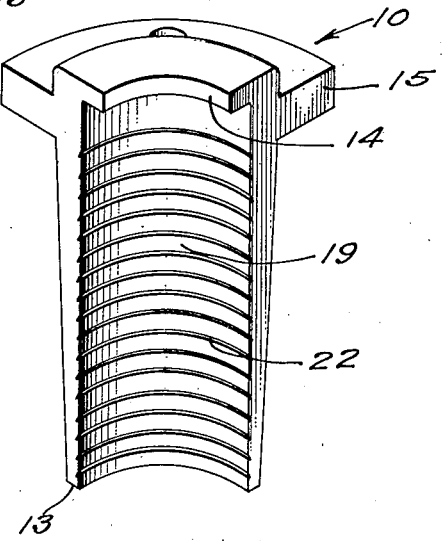
INVENTOR
Roy C. Croslen
BY Lyon+Lyon
ATTORNEYS Patented Feb. 2, 1932

1,843,123

UNITED STATES PATENT OFFICE

ROY C. CROSLEN, OF WHITTIER, CALIFORNIA, ASSIGNOR OF ONE-THIRD TO JAMES CLARENCE PERKINS, OF WHITTIER, CALIFORNIA, AND ONE-THIRD TO NEWTON M. WICKERSHAM, OF LOS ANGELES, CALIFORNIA

HIGH PRESSURE HOSE CONNECTION

Application filed February 3, 1930. Serial No. 425,509.

This invention relates to high pressure hose connections. While the connection can be used for various specific purposes, it is expected to be particularly useful in connection with the drilling of oil wells or other deep wells where high pressure must be used in connection with cementing operations or the like. These pressures sometimes exceed 700 or 800 pounds per square inch and it is very difficult to produce a connection that will withstand such pressures without leaking. A common type of connection used for high pressures consists of an inner sleeve which is thrust into the end of the hose and the hose at the location of the sleeve is surrounded by a sleeve formed in two segments that are bolted together. In that type of connection the outer clamping sleeve consists of two semi-tubular sections that in clamping up the sleeve are pulled inwardly toward the axis of the connection.

One of the objections to that type of connection is that the greatest pressure of the clamp on the hose occurs at about the middle radial plane of the clamping sleeve which causes the material of the hose to be crowded toward the space between the two sections of the clamping sleeve. In this way the clamp may actually hold the wall of the hose adjacent the gap or space between the adjacent edges of the two sleeve sections in such a way as to cause a leak at those points. For this reason that type of connection is not satisfactory, although it is in use for high pressure connections.

The general object of this invention is to produce a high pressure hose connection of simple construction which will overcome these difficulties and which will enable a hose end to be firmly clamped without tending to produce a gap at any point around the wall of the sleeve; also to provide a high pressure hose connection of simple construction in which the sections or segments of the outside sleeve can be clamped up by means of bolts extending longitudinally with the hose.

Further objects of the invention will appear hereinafter.

The invention consists of novel parts and combinations of parts to be described hereinafter, all of which contribute to produce an efficient high pressure hose connection.

A preferred embodiment of the invention is described in the following specification, while the broad scope of the invention is pointed out in the appended claims.

In the drawings:

Figure 1 is a side elevation and partial section illustrating a hose connection embodying my invention and showing a short portion of the hose end broken away.

Figure 2 is a cross section taken about on the line 2—2 of Figure 1 and further illustrating the arrangement of the parts illustrated in Figure 1.

Figure 3 is a perspective of one of the segments of a split sleeve forming a part of the device.

Referring more particularly to the parts, 1 represents a hose end carrying one of my connections. The connection includes an inner sleeve 2 which is preferably formed with a wavy outer face 3, that is to say, the outer face is formed with circumferential or helical corrugations. This inner sleeve is of tubular form. When forming the connection it is thrust into the end of the hose until a collar 4 on the outer portion of the sleeve lies adjacent to the end face 5 of the hose. The outer part of this sleeve has any suitable construction to enable it to connect to another part, such as a casing head. For example, the outer portion of the inner sleeve 2 may be formed into a nut 6 beyond which a tapered threaded nipple 7 is provided to screw into a casing head or a pipe fitting. After putting the inner sleeve 2 in position or, if desired, before the sleeve 2 is in position, I slip over the end of the hose a clamping sleeve 8 which is also of tubular form and this sleeve has a tapered or conical bore 9 with the end of large diameter toward the end face 5 of the hose.

The function of this clamping sleeve 8 is to clamp an outer sleeve 10 against the outer side of the hose and press the wall of the hose against the outer face of the inner sleeve 2. This sleeve 10 is a split sleeve consisting of more than two sections; it is preferably in four sections so that four gaps or "splits" 11 are formed. One of these sections 12 is illustrated in Figure 3. Their side edges lie adjacent to each other.

Each segment therefore constitutes a quarter of the sleeve and the segments are all tapered longitudinally with the thin end 13 of the segment disposed remotely from the collar 4 of the coupling. At its outer end each segment 12 is provided with means for engaging the outer face of the collar 4 and this means is preferably in the form of an inwardly projecting flange 14 (see Figure 3). After the segments 12 have been put in position, as shown, the clamping sleeve 8 is then slid toward the collar 4 so that its tapered bore 9 engages the correspondingly tapered outer faces of the split sleeve 10. Any suitable means may be provided for forcing or drawing the clamping sleeve 8 tight on the split sleeve 10. For this purpose, I prefer to provide the split sleeve with an outwardly projecting flange or collar 15 and I provide a similar collar or flange 16 at about the middle of the clamping sleeve 8. These flanges give opportunity to mount draw-bolts 17 in the flanges, said draw-bolts carrying nuts 18 which can be tightened up on the threaded ends of the draw-bolts to pull the clamping collar very securely onto the split sleeve.

By reason of the conical or tapered bore 9 of the clamping sleeve, a very great clamping force can be developed, forcing the segments 12 radially inward at four points on the circumference of the hose.

When the segments 12 move inwardly in this way, the clamping force is applied along four radial lines and there is a very slight tendency to produce any displacement of the hose wall into the gaps 11. This effect cannot be attained if the outer sleeve is formed of two sections, because in that case the clamping forces are applied at two diametrically opposite points, thereby crowding the rubber wall out into the two gaps where relatively little clamping effect occurs. The inner face 19 of each segment is bored to a proper radius to insure that when the connection is tightened up the wall of the hose will be clamped with about the same pressure adjacent the gaps as in the middle radial plane of each segment.

In setting the clamping sleeve 8 on the split sleeve 10 preparatory to tightening up on the nuts 18, care should be taken that the bolt openings 20 in the collar 16 are in proper alignment with corresponding openings 21 in the collar 15.

If desired, the inner faces of the segments 12 may be formed with grooves or wickers 22 to increase the holding power on the outer surface of the hose. These wickers preferably have abrupt shoulders 23 on the side remote from the collar 4. This enables the wickers to assist in preventing the high pressure from pulling the hose end out of the connection.

The use of unthreaded engaging faces between the sleeve 10 and the outer sleeve 8 is highly advantageous in combination with the clamping bolts 17, because it enables the clamping sleeve 8 to be driven up into position and made fairly tight by hammer blows delivered on the butt end of the sleeve, after which the nuts 18 can be tightened up. In a similar manner, the clamping sleeve can be readily detached by hammer blows delivered on the flange 16 in the opposite direction after the nuts 18 have been removed. This enables the coupling to be very quickly connected up or disconnected.

It is understood that the embodiment of the invention described herein is only one of the many embodiments this invention may take, and I do not wish to be limited in the practice of the invention, nor in the claims, to the particular embodiment set forth.

What I claim is:

1. In a high-pressure hose connection, the combination of an inner sleeve to be received in the end of the hose, said sleeve having a collar at its outer end, a split sleeve longitudinally tapered to envelop the outer side of the hose at the inner sleeve, said split sleeve comprising more than two segments with their side edges adjacent to each other, the ends of said segments having means for engaging the outer side of the collar of the inner sleeve, a clamping sleeve having a tapered bore to slip over the inner end of the split sleeve, said split sleeve and said clamping sleeve having bolts for drawing the clamping sleeve toward the said collar.

2. In a high-pressure hose connection, the combination of a hose, an inner sleeve received in the end of the hose and having an integral collar beyond the hose end, a split, longitudinally tapered sleeve enveloping the outer side of the hose at the inner sleeve and comprising a plurality of segments having their greatest thickness of wall adjacent the collar and their least thickness of wall toward the inner end of the inner sleeve and placed with their side edges adjacent to each other, thereby preventing the wall of the hose from being forced out into the space between said side edges, the ends of said segments having means for engaging the outer side of the said collar, a clamping sleeve having a tapered bore to slip over the inner end of the split sleeve, said split sleeve and said clamping sleeve having opposed flanges, respectively, with clamping bolts connecting said flanges for drawing the clamping sleeve toward the said collar.

3. In a high-pressure hose connection, the combination of an inner sleeve to be received in the inner end of the hose, said sleeve having a collar at its outer end, a split, longitudinally tapered sleeve to envelop the outer side of the hose at the inner sleeve, said split sleeve comprising a plurality of segments with their side edges disposed adjacent to each other to prevent the hose from being forced into the space between the same, the outer end of each of said segments having a flange projecting inwardly toward the axis of the coupling and engaging the outer face of the said collar, a clamping sleeve having a tapered bore to slip over the inner end of the split sleeve, said split sleeve and said clamping sleeve having opposed flanges, respectively, and bolts connecting said flanges for drawing the clamping sleeve toward the said collar.

Signed at Whittier, California, this 28th day of January, 1930.

ROY C. CROSLEN.